United States Patent
Chiruta et al.

(10) Patent No.: US 11,946,404 B2
(45) Date of Patent: Apr. 2, 2024

(54) DIESEL FUEL DOSING MODULE FOR REGENERATION OF DIESEL PARTICULATE FILTERS WITH CONTINUOUS PURGING

(71) Applicant: Cummins Filtration IP, Inc., Columbus, IN (US)

(72) Inventors: Mihai Chiruta, Madison, WI (US); Barry Mark Verdegan, Stoughton, WI (US); Wassem Abdalla, Fishers, IN (US); Z. Gerald Liu, Madison, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

(21) Appl. No.: 17/312,593

(22) PCT Filed: Dec. 6, 2019

(86) PCT No.: PCT/US2019/064997
§ 371 (c)(1),
(2) Date: Jun. 10, 2021

(87) PCT Pub. No.: WO2020/123304
PCT Pub. Date: Jun. 18, 2020

(65) Prior Publication Data
US 2022/0042432 A1  Feb. 10, 2022

Related U.S. Application Data

(60) Provisional application No. 62/780,044, filed on Dec. 14, 2018.

(51) Int. Cl.
*F01N 3/00* (2006.01)
*F01N 3/025* (2006.01)
(Continued)

(52) U.S. Cl.
CPC .......... *F01N 3/025* (2013.01); *F01N 3/0253* (2013.01); *F01N 3/36* (2013.01); *F02M 37/48* (2019.01);
(Continued)

(58) Field of Classification Search
CPC .... F01N 3/025; F01N 3/0253; F01N 2610/03; F01N 2610/08; F01N 2610/146; F01N 2610/1493; B01F 23/23; B01F 23/231
See application file for complete search history.

(56) References Cited

U.S. PATENT DOCUMENTS 4,987,738 A * 1/1991 Lopez-Crevillen ..... F01N 3/025
60/303
5,462,679 A   10/1995 Verdegan et al.
(Continued)

FOREIGN PATENT DOCUMENTS

CN  102362052    2/2012
CN  102362052 A  2/2012
(Continued)

OTHER PUBLICATIONS

International Search Report and Written Opinion Issued for PCT Application No. PCT/US2019/064997 dated Apr. 23, 2020, 14 pages.
(Continued)

*Primary Examiner* — Matthew T Largi
(74) *Attorney, Agent, or Firm* — Foley & Lardner LLP

(57) ABSTRACT

Various example embodiments relate to a system that includes a nozzle. A dosing line is connected to the nozzle and a fuel dosing module. The fuel dosing module is in fluid communication with the dosing line and includes an outlet in fluid communication with the dosing line. An air inlet is positioned upstream of the outlet and is configured to receive air. A fuel inlet is positioned upstream of the outlet
(Continued)

and is configured to receive fuel. A fuel valve is positioned upstream of the outlet and downstream of the fuel inlet and is configured to control the flow of fuel. The fuel dosing module is configured to combine the fuel and the air upstream of the outlet and downstream of the fuel valve to generate an air-fuel fluid, wherein the air-fuel fluid removes particles from the nozzle.

18 Claims, 11 Drawing Sheets

(51) Int. Cl.
  *F01N 3/36* (2006.01)
  *F02M 37/48* (2019.01)
(52) U.S. Cl.
  CPC ...... *F01N 2610/03* (2013.01); *F01N 2610/08* (2013.01); *F01N 2610/146* (2013.01); *F01N 2610/1493* (2013.01)

(56) References Cited

U.S. PATENT DOCUMENTS

| | | | |
|---|---|---|---|
| 5,482,021 A | 1/1996 | Roche | |
| 5,983,865 A * | 11/1999 | Yamashita | F02M 69/08 123/26 |
| 6,273,120 B1 * | 8/2001 | Hofmann | B01D 53/9495 137/98 |
| 6,715,292 B1 * | 4/2004 | Hoke | F23D 11/107 239/404 |
| 7,367,182 B2 | 5/2008 | Takahashi et al. | |
| 7,805,930 B2 * | 10/2010 | Satou | B01D 53/9431 60/303 |
| 8,371,107 B2 * | 2/2013 | Haeberer | F01N 9/00 239/533.11 |
| 9,032,710 B2 | 5/2015 | White et al. | |
| 2005/0274107 A1 | 12/2005 | Liu et al. | |
| 2007/0033927 A1 | 2/2007 | Homby et al. | |
| 2008/0016851 A1 | 1/2008 | McCarthy et al. | |
| 2008/0022660 A1 | 1/2008 | Reuter et al. | |
| 2008/0034733 A1 * | 2/2008 | Miller | F01N 3/32 60/297 |
| 2008/0245058 A1 * | 10/2008 | Boddy | F01N 3/36 60/299 |
| 2009/0038299 A1 * | 2/2009 | Gierszewski | F01N 11/00 60/301 |
| 2009/0101656 A1 * | 4/2009 | Leonard | F01N 13/009 220/562 |
| 2009/0139209 A1 * | 6/2009 | Beck | B01D 53/9431 60/274 |
| 2011/0016854 A1 * | 1/2011 | Gaudin | F01N 3/025 60/299 |
| 2011/0030334 A1 * | 2/2011 | Garcia | F01N 3/36 60/39.094 |
| 2011/0203257 A1 * | 8/2011 | White | F01N 3/035 60/274 |
| 2012/0042635 A1 * | 2/2012 | Hochholzner | F01N 3/208 60/274 |
| 2013/0060452 A1 * | 3/2013 | Saruwatari | F02D 41/3094 701/105 |
| 2015/0192050 A1 * | 7/2015 | Meier | F01N 3/2033 60/274 |
| 2017/0328252 A1 * | 11/2017 | Jin | F01N 3/208 |
| 2020/0240349 A1 * | 7/2020 | Ueno | F02M 69/54 |
| 2020/0370499 A1 * | 11/2020 | Takemoto | F02D 41/3836 |

FOREIGN PATENT DOCUMENTS

| | | |
|---|---|---|
| EP | 2 179 148 B1 | 4/2010 |
| WO | WO-2020/095259 | 5/2020 |

OTHER PUBLICATIONS

Extended European Search Report on EP dated Aug. 5, 2022 (7 pages).
First Office Action on CN 2019800816557 dated Jun. 29, 2022 (11 pages) (with English Translation).
Extended European Search Report issued for European Patent Application No. EP19896277.1 dated Aug. 5, 2022 (7 pages).
First Office Action issued for Chinese Patent Application No. CN 2019800816557 dated Jun. 29, 2022 (11 pages) (with English Translation).

* cited by examiner

DIESEL FUEL DOSING MODULE FOR REGENERATION OF DIESEL PARTICULATE FILTERS WITH CONTINUOUS PURGING

CROSS-REFERENCE TO RELATED APPLICATIONS

The present application is a National Stage of PCT Application No. PCT/US2019/064997 filed Dec. 6, 2019, which claims priority to U.S. Provisional Patent Application No. 62/780,044, filed Dec. 14, 2018. The contents of these applications are incorporated herein by reference in their entirety and for all purposes.

TECHNICAL FIELD

The present application relates generally to the filtration systems and aftertreatment systems for filtering fluids in internal combustion engine systems or the like.

BACKGROUND

For internal combustion engines, such as diesel engines, nitrogen oxide ($NO_x$) compounds and particulate matter may be emitted in the exhaust. A diesel particulate filter (DPF) can be included with the internal combustion engine, either alone or within a selective catalytic reduction (SCR) system, to remove the particulate matter from the exhaust stream. In some instances, the DPF may be upstream of the SCR system, downstream of the SCR system or within the SCR system. Periodic regeneration of DPFs is required to ensure proper functioning of the DPFs and the system(s). Regeneration may be mitigated or managed through the dosing (e.g., injecting) of diesel fuel upstream of a diesel oxidation catalyst (DOC). In some arrangements, the dosing of diesel fuel upstream of the DOC raises the temperature in the system.

SUMMARY

Various example embodiments relate to a system and method for the installation and use of such a system. The system includes a nozzle. A dosing line is connected to the nozzle and a fuel dosing module. The fuel dosing module is in fluid communication with the dosing line. The fuel dosing module includes an outlet in fluid communication with the dosing line. An air inlet is positioned upstream of the outlet. The air inlet is configured to receive air. A fuel inlet is positioned upstream of the outlet. The fuel inlet is configured to receive fuel. A fuel valve is positioned upstream of the outlet and downstream of the fuel inlet. The fuel valve is configured to control the flow of fuel. The fuel dosing module is configured to combine the fuel and the air upstream of the outlet and downstream of the fuel valve to generate an air-fuel fluid, wherein the air-fuel fluid removes particles from the nozzle.

Various other example embodiments relate to a method of purging particles from a dosing line connected to a nozzle. The method includes opening an air valve of a fuel dosing module. The air valve positioned upstream of the outlet and downstream of an air inlet configured to receive air. A fuel valve of the fuel dosing module is opened from a closed position subsequent to opening the air valve. The fuel dosing module is in fluid communication with the dosing line. The fuel valve positioned upstream of an outlet and downstream of a fuel inlet. The fuel inlet is configured to receive fuel and the outlet in fluid communication with the dosing line. The fuel valve is oscillated by opening and closing at a frequency, thereby generating an air-fuel fluid. The air-fuel fluid removes particles from along the dosing line and the nozzle. The air-fuel fluid is generated as a result of the oscillation of the fuel valve, allowing a flow of fuel to the outlet and the flow of air through the air valve to the outlet.

Various other example embodiments relate to a fuel dosing module in fluid communication with a dosing line. The fuel dosing module includes an outlet in fluid communication with the dosing line. An air inlet is positioned upstream of the outlet. The air inlet is configured to receive air. A fuel inlet is positioned upstream of the outlet. The fuel inlet is configured to receive fuel. A fuel valve is positioned upstream of the outlet and downstream of the fuel inlet. The fuel valve is configured to control the flow of fuel. The fuel dosing module is configured to combine the fuel and the air upstream of the outlet and downstream of the fuel valve to generate an air-fuel fluid, wherein the air-fuel fluid removes particles along the dosing line.

These and other features, together with the organization and manner of operation thereof, will become apparent from the following detailed description when taken in conjunction with the accompanying drawings, wherein like elements have like numerals throughout the several drawings described below.

Figure 1:
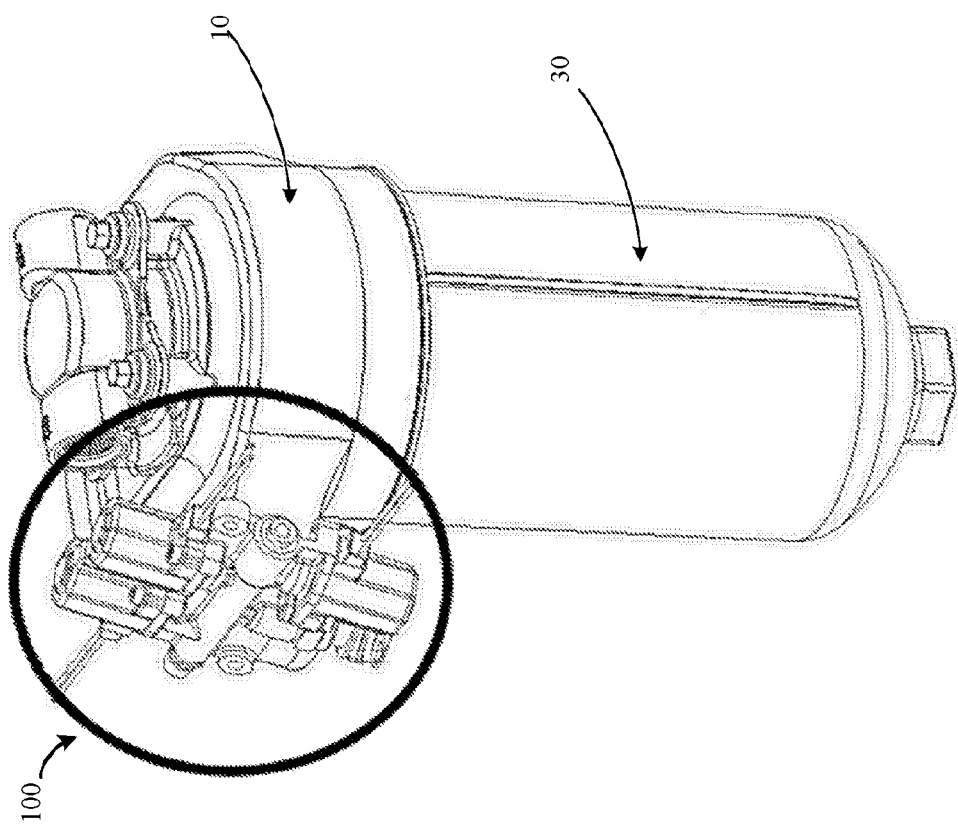
FIG. 1 is a diesel fuel dosing module in a fuel filter module, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

As described above, deposits build up over time on doser injector nozzles until steps are taken to mitigate the buildup.

Coking may also occur in the dosing line and nozzle. Some systems implement a method and apparatuses that clean, remove, and/or re-entrain (e.g., purge) particles from the dosing lines and nozzle of fuel using air flow. The cleaning, removing, and/or re-entraining of the particles may occur during the cleaning state/mode, or similar state, of the system. Typically, these systems consist of separate lines with associated valves running from the air and fuel sources to the doser. These systems suffer from a number of deficiencies including the requirement of multiple components to keep the nozzle free of deposits, inability to remove particles from the lines of fuel when regeneration is not occurring, inability to provide reliable DPF regeneration, and overcomplicated control of the system. Beneficially, an air-assisted fuel dosing module (FDM) is described that may be implemented within a DPF system to provide continuous or near continuous removal of particles from the dosing line to minimize coking and avoid deposits in the nozzle or dosing line(s), mitigate fouling of the of the diesel fuel injector used for regeneration of DPFs, reduce drop size generated by the nozzle (enhancing atomization and burning of fuel), and may be integrated into an existing controller in the system (e.g., engine control monitoring (ECM)) with minimal additions of components and/or required inputs, and increased fuel pressure in the dosing line, reducing the size of droplets formed at the nozzle and improving combustion of the fuel. The FDM with an air-assisted doser may be a standalone component or a part of the overall fuel module to reduce complexity, cost, and components for minimizing and avoiding nozzle deposits within the system.

Referring to the figures generally, a filtration system that includes an air-assisted FDM for a DPF system that air removes particles from the dosing line to prevent buildup of deposits and/or contamination on the nozzle and in the dosing line is described. Contamination may incur in a wide variety of ways, for example by deposits entering the system via ingression with the incoming fuel or air, by the degradation of the fuel at elevated temperature within the system, and/or the formation of soot at the nozzle tip or collected from the exhaust gases. In some embodiments, the air-assisted FDM implements an air-assisted doser to provide a wide range of fuel to air ratios to remove particles from the dosing line. The air-assisted FDM may include a housing with a manifold, fuel inlet, air inlet, outlet, and one to three valves to control flow rate(s) of fuel and air to the dosing line. The air-assisted FDM may remove particles from a dosing line such that some air is always going through the dosing line. In some embodiments, the cleaning cycle occurs with a mixture containing at least 5% air (with the remainder being fuel). The air-assisted FDM provides a reduction in the system complexity by comprising fewer valves and/or plumbing compared to conventional FDM systems and utilizes simplified or integrated controls. In some embodiments, the air-assisted FDM provides continuous removal (e.g., the air flow is never completely shut off) such that there is no separate purging mode (e.g., purge state of the system) of operation. In those embodiments, the continuous removal eliminates the need for a separate air flow control system. In some embodiments, the air-assisted FDM may be controlled by a shutoff valve and fuel control valve (e.g., a hydrocarbon dosing valve), each of which are controlled by an ECM or existing controller in the FDM system.

Expanding further, the FDM system described herein improves upon existing doser systems by implementing a cleaning mode (e.g., cleaning state of the system) whereby an air-fuel mixture or foam (herein referred to as "mixture") is introduced to create transient conditions more favorable for the re-entrainment of contaminant, deposits, and other undesirable material that may accumulate in the lines, nozzle and valves. In engine and hydraulic filtration, transient conditions—such as flow surges and vibration—can re-entrain contaminants from filters and the associated fluid lines. These transient conditions are more effective at re-entraining contaminant than constant flow rate steady state conditions. In current filtration system, re-entrainment of contaminants is undesirable and thus are avoided, impeded, and/or prevented where possible. Conversely, the FDM system described herein utilizes transient conditions to prevent debris and buildup from occurring in the dosing system as the contamination is released from the system and transported downstream by the flow of the FDM system mixture and injected into the exhaust gas stream (e.g., downstream the outlet tube) where it is burned.

The FDM system—as shown in the FDM systems of FIGS. 1-9—maintains doser cleanliness through the (1) air-fuel foam flowing through the lines downstream of the fuel control valve and (2) rapid oscillation of the fuel control valve during the cleaning mode. In the FDM system, the air-fuel mixture flowing through the lines downstream of the fuel control valve facilitates the re-entrainment of contaminant from the dosing lines and nozzle as the bubbles from the mixture (e.g., foam) create local turbulence at surfaces. The air-fuel mixture/interface passing over contaminants facilitates release of the contaminants from the surfaces of the dosing system(s). In conjunction with the flow of air-fuel foam, the FDM system rapidly oscillates the fuel control valve during the cleaning mode, producing a series of flow surges both upstream and downstream of the fuel control valve. In other words, the oscillation together with the bends and constrictions in the orientation and configuration of the dosing line at the operating flow rate create bubbles (e.g., foam) of the air-fuel fluid mixture. These upstream and downstream surges facilitate re-entrainment of contamination deposited in the lines, fuel control valve, and/or fuel valve. In some embodiments, the FDM system implements the cleaning mode after a dosing mode (e.g., dosing state of the system), whereby fuel is injected, and a purging mode, whereby fuel is flushed out of the lines. In other embodiments, the cleaning mode occurs after the dosing mode, but before a purging mode. In those embodiments, the FDM system may detect the presence of ingressed contamination, thereby causing the FDM system to implement the cleaning mode after the dosing mode, but before the purging mode. In other words, the dosing mode may occur before or after the cleaning mode and the purging mode occurs after the dosing mode and cleaning mode.

Unless otherwise states, as used herein the term "mode" (e.g., purging mode, cleaning mode, dosing mode, etc.) is intended to describe the system in a "state" (e.g., purging state, cleaning state, dosing state, etc.) and/or the system undergoing a cycle (e.g., purging cycle, cleaning cycle, dosing cycle, etc.). Generally, a cleaning mode occurs when the FDM system provides an air/fuel foam mixture that passes through the lines while fuel valve is oscillated to clean contaminant from lines. In some embodiments, the cleaning mode uses a mixture that is at least 5% air. A dosing mode is when the FDM system injects fuel into the exhaust stream to regenerate the DPF. A purging mode occurs when the FDM system uses air to flush fuel out of lines following dosing or cleaning. As used herein, the term fuel control valve refers to a valve that controls the fuel flow rate, the term fuel shutoff valve refers to a valve that binarily controls the fuel flow (e.g., on or off), and the term fuel valve refers to a valve that is either the fuel shutoff valve or fuel control valve.

FIG. 1 shows a perspective view of a FDM 100 implemented within a fuel filter module 10. The fuel filter module 10 includes a stage two fuel filter 30. In some embodiments, the FDM 100 is disposed between a stage one fuel filter and the stage two fuel filter 30. Generally, the FDM 100 injects fuel into the exhaust aftertreatment, where the fuel is burned, raising the temperature of the DPF, and enabling the DPF to be regenerated. By maintaining the doser lines, doser nozzle, and associated valves in a clean state—free of any debris or buildup (e.g., soot at the nozzle tip)—fuel flow is less likely to be hindered. As described in greater detail below, the implementation of an air-assisted FDM (e.g., the air-assisted FDM system 100) can prevent injector tip fouling by incomplete burnt fuel when the exhaust is too rich by adding air to the fuel to be sprayed. The air-assisted FDM 100 allows for centerline injection to provide a good uniformity index of the spray resulting in less thermal stress on a DOC. The air-assisted FDM 100 also provides higher pressure in the dosing line, resulting in the production of a finer aerosol by the nozzle and more efficient combustion of the fuel.

Figure 2A:
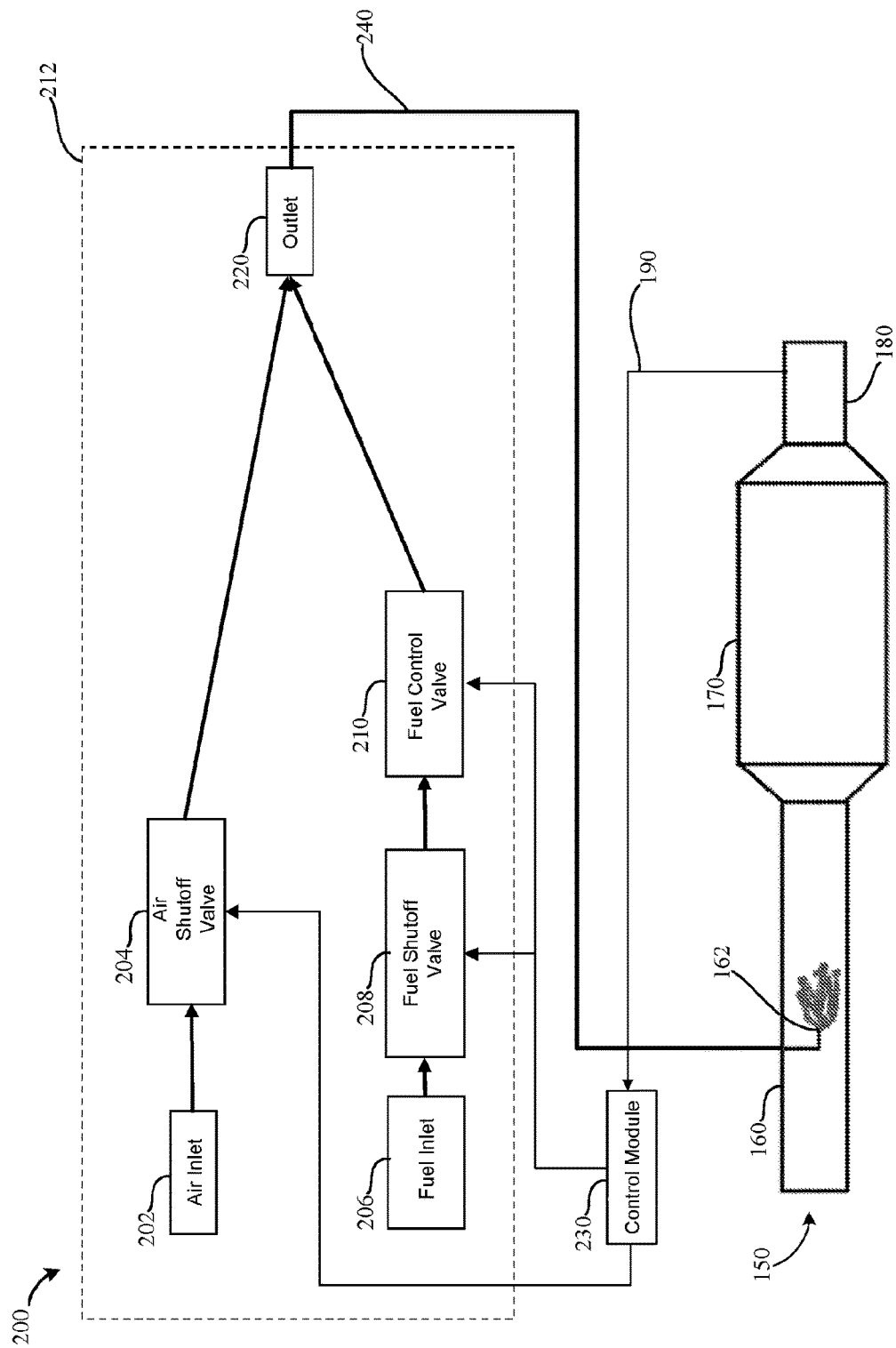
FIG. 2A is a schematic block diagram of a fuel dosing module (FDM) implemented in an exhaust system, according to an example embodiment.

Turning to FIG. 2A, a schematic block diagram of an FDM 200 implemented within an exhaust system 150 is shown, according to an example embodiment. The exhaust system 150 includes a fuel spray tube 160 with nozzle 162 in fluid communication with a dosing line 240, a DOC chamber 170, and an outlet tube 180. Fluid may travel into the fuel spray tube 160, through the DOC chamber 170, to the outlet tube 180. The outlet tube 180 may include a sensor or other electrical connector 190 operably connected to a control module 230. The FDM 200 components are shown within the dashed box and includes an air inlet 202 (e.g., air flow inlet), air shutoff valve 204 (e.g., air valve, air flow valve, etc.), a fuel inlet 206 (e.g., fuel flow inlet), a fuel shutoff valve 208, a fuel control valve 210, and an outlet 220. In some embodiments, the dashed box is a housing 212 for the FDM 200. The air from the air inlet 202 flows through the air shutoff valve 204 to the outlet 220. The fuel from the fuel inlet 206 flows through the fuel shutoff valve 208 and the fuel control valve 210 to the outlet 220. The control module 230 (e.g., ECM) may be operably connected to at least one of the air shutoff valve 204, the fuel shutoff valve 208, and the fuel control valve 210. The dosing line 240 connects the outlet 220 with the nozzle 162 in the fuel spray tube 160.

Figure 2B:
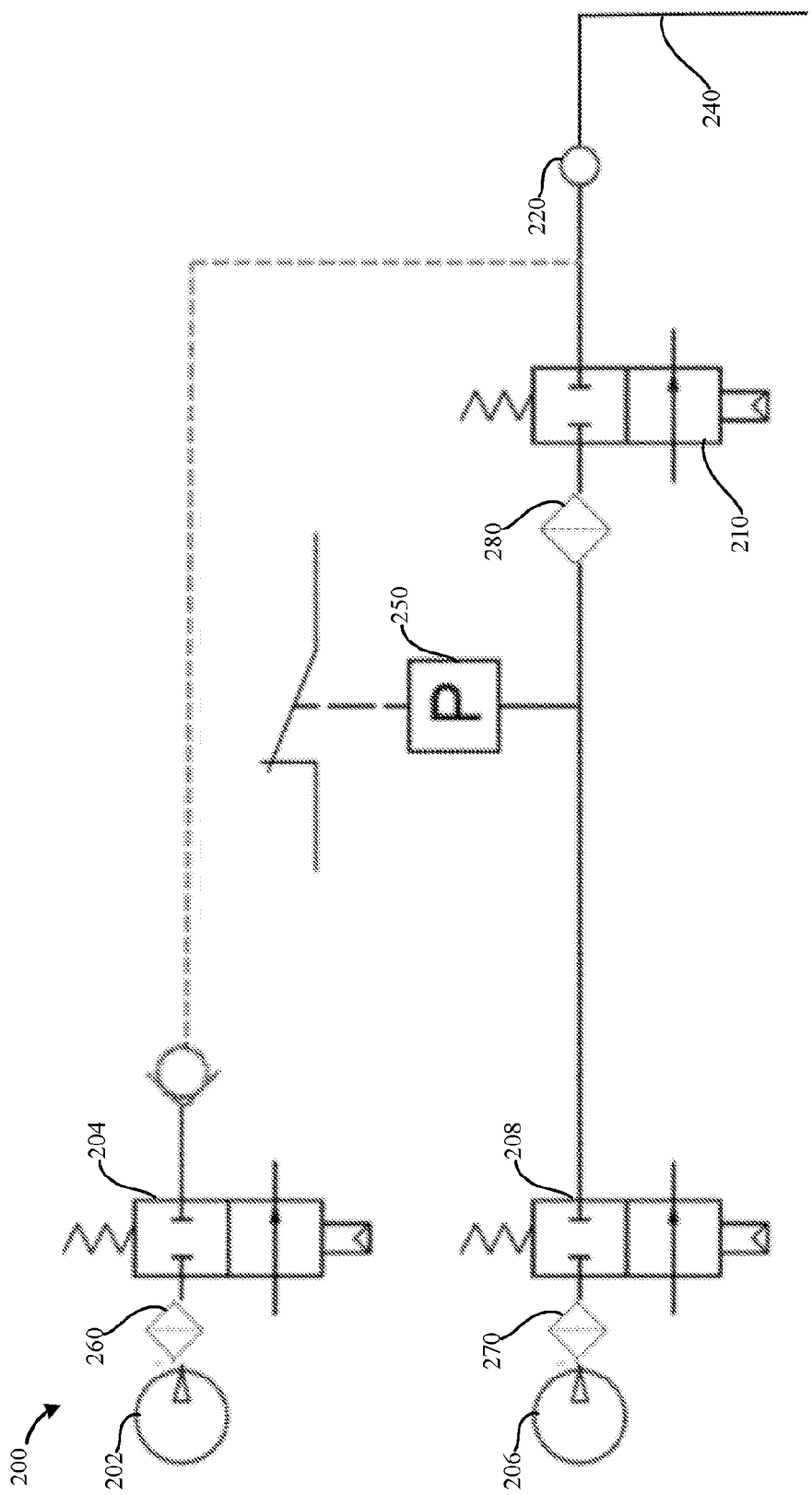
FIG. 2B is a schematic block diagram of the hardware of the FDM implemented in the exhaust system of FIG. 2A.

FIG. 2B shows a schematic block diagram of the hardware of the FDM 200 of FIG. 2A. In some embodiments, a pressure sensor 250 may be implemented downstream of the fuel shutoff valve 208 and upstream of the fuel control valve 210. The pressure sensor 250 may be configured to monitor the pressure through the flow passages and/or across the first inlet 260 of the air shutoff valve 204, the second inlet 270 of the fuel shutoff valve 208, and/or the third inlet 280 of the fuel control valve 210. In one embodiment, the first inlet 260 has a flow passage diameter of 140 μm, the second inlet 270 has a flow passage diameter of 140 μm, and the third inlet 280 has a flow passage diameter of 75 μm.

Generally, a dosing mode to regenerate the DPF occurs when fuel is injected through the fuel inlet 206. An air purging mode to flush fuel out of the lines occurs when air is injected through the air inlet 202. The FDM 200 implements a cleaning mode whereby an air-fuel mixture is introduced to create transient conditions more favorable for the re-entrainment of contaminant, deposits, and other undesirable material that may accumulate in the flow passages in the housing 212, dosing line(s) 240, and/or nozzle 162. First, the air-fuel foam flowing through the lines downstream of the fuel control valve 210 facilitates the re-entrainment of contaminant from the dosing line(s) 240 and nozzle 162. The bubbles create local turbulence at surfaces and the air-fuel interface passing over contaminants facilitates their release from the surfaces of the dosing system. Second, the rapid oscillation of the fuel control valve 210 during the cleaning mode produces a series of flow surges both upstream and downstream of the fuel control valve 210 facilitating re-entrainment of contamination that may have deposited in the lines, fuel control valve 210 or fuel shutoff valve 208. In some embodiments, the FDM 200 implements the cleaning mode operation in coordination with the dosing mode to ensure that re-entrained contamination is removed from the system. In some embodiments, multiple cleaning cycles are implemented with each cycle separated by dosing cycles of operation. In other embodiments, the cleaning mode operation may occur upon completion of the dosing mode and prior to the start of the purging mode, or a time similar to when the most ingressed contamination is present in the system.

In one embodiment, a cleaning cycle of the FDM 200 comprises opening and closing the fuel control valve 210 at a frequency of 2 Hz. The opening and closing of the fuel control valve 210 occurs at a specified flow rate and is open for approximately five second while the fuel shutoff valve 208 is open. The fuel control valve 210 opening frequency, flow rate, duration of the cleaning cycle, number of cleaning cycles per regeneration, and number of times a cleaning cycle is implemented can be adjusted per the application. The air shutoff valve 204 is open during the oscillations of the fuel control valve 210 and is open during at least 1 cleaning cycle for each regeneration when cleaning is conducted. The cleaning cycle is initiated at multiple distinct points substantially evenly spaced over each DPF regeneration period.

In one embodiment, the cleaning may be initiated at three distinct points with an initial cycle of dosing, cleaning and removing, an intermediate cycle of dosing, cleaning and removing, and a final cycle of dosing, cleaning and removing. The initial cleaning cycle precedes the dosing cycle and follows the purging cycle (e.g., cycle that completes a purging mode). The air shutoff valve 204 is open during the purging cycle and is left open for the first cleaning cycle. The final cleaning cycle starts at the end of the final dosing cycle and precedes the final purging cycle. Once the final dosing cycle is complete, the air shutoff valve 204 is opened for the final cleaning cycle and following purging cycle. For the initial and final cleaning cycles, the fuel flow rate may be approximately 10% of the maximum duty cycle flow rate. Midway through the dosing cycle, a third cleaning cycle would be initiated. The fuel flow rate for the midway cycle is approximately the maximum duty cycle flow rate. Other modes of operation utilizing different fuel control valve 210 opening frequency, fuel or air flow rate, duration of the cleaning cycle, and number of cleaning cycles per regeneration may be implemented. Further, in some embodiments it may be necessary to only clean the system every other, third, fourth, etc. regeneration cycle (e.g., not each regeneration cycle).

Figure 3:
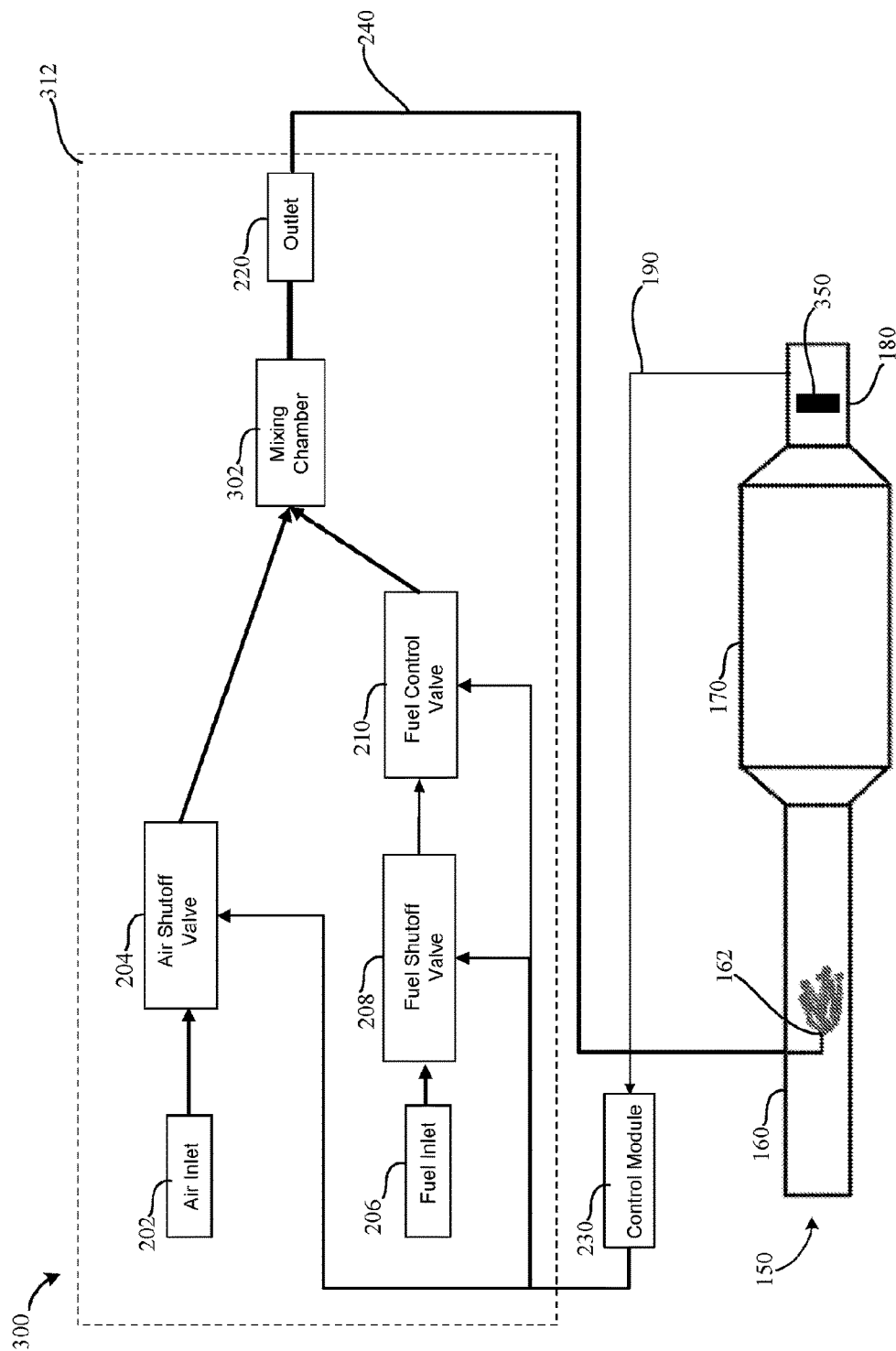
FIG. 3 is a schematic block diagram of an air-assisted FDM implemented in an exhaust system, according to an example embodiment.

Referring to FIG. 3, a schematic block diagram of an air-assisted FDM 300 implemented in an exhaust system 150 is shown, according to an example embodiment. The FDM 300 is similar to the FDM 200 of FIG. 2A. A difference between the FDM 300 and the FDM 200 is the FDM 300 includes a mixing chamber 302 that receives air and fuel and the exhaust system 150 includes a thermocouple 350 within the outlet tube 180. Accordingly, like numbering is used to designate like parts between the FDM 300 and the FDM 200. The air-assisted FDM 300 may be included within a housing 312. The housing 312 includes an air inlet 202, air shutoff valve 204, a fuel inlet 206, a fuel shutoff valve 208, a fuel control valve 210, a mixing chamber 302, and an outlet 220. The mixing chamber 302 is configured to receive air from the air shutoff valve 204 and fuel from the fuel control valve 210 and output the mixed fluid to the outlet 220. The air and fuel may be mixed in a separate mixing chamber 302, in separate ports to a mixing chamber, by introducing the air upstream of the fuel control valve 210, or by causing the two fluids to meet in a T- or Y-connection. During normal operation of the engine, the fuel shutoff valve 208 is closed. Accordingly, the air shutoff valve 204 and fuel control valve 210 do not completely shutoff flow of their respective fluids. Specifically, the air-assisted FDM 300 is configured such that air flow is removing particles from the dosing line 240 continuously during normal operation of the engine.

When the DPF needs to be regenerated, the fuel shutoff valve 208 is opened and the fuel control valve 210 is open to the degree required for regeneration—as indicated by the control module 230. In some embodiments, the cleaning cycle occurs with a mixture containing at least 5% air (with the remainder being fuel). In some embodiments, a thermocouple 350 or other temperature sensor is positioned on the downstream side of the DOC chamber 170 and is configured to send a signal to the control module 230. The signal may cause the control module 230 to adjust one or more connected valves to control temperature of the exhaust gas during regeneration of the DPF. In the cleaning mode of the FDM 300, there is no separate purging mode of operation as the FDM system 300 provides continuous or near continuous air flow to accomplish a continuous or near continuous removal of particles from the system during engine operation and dosing modes. Further, during dosing the flow is air-assisted to increase dosing line pressure and reduce the size of droplets generated by the nozzle 162.

Figure 4:
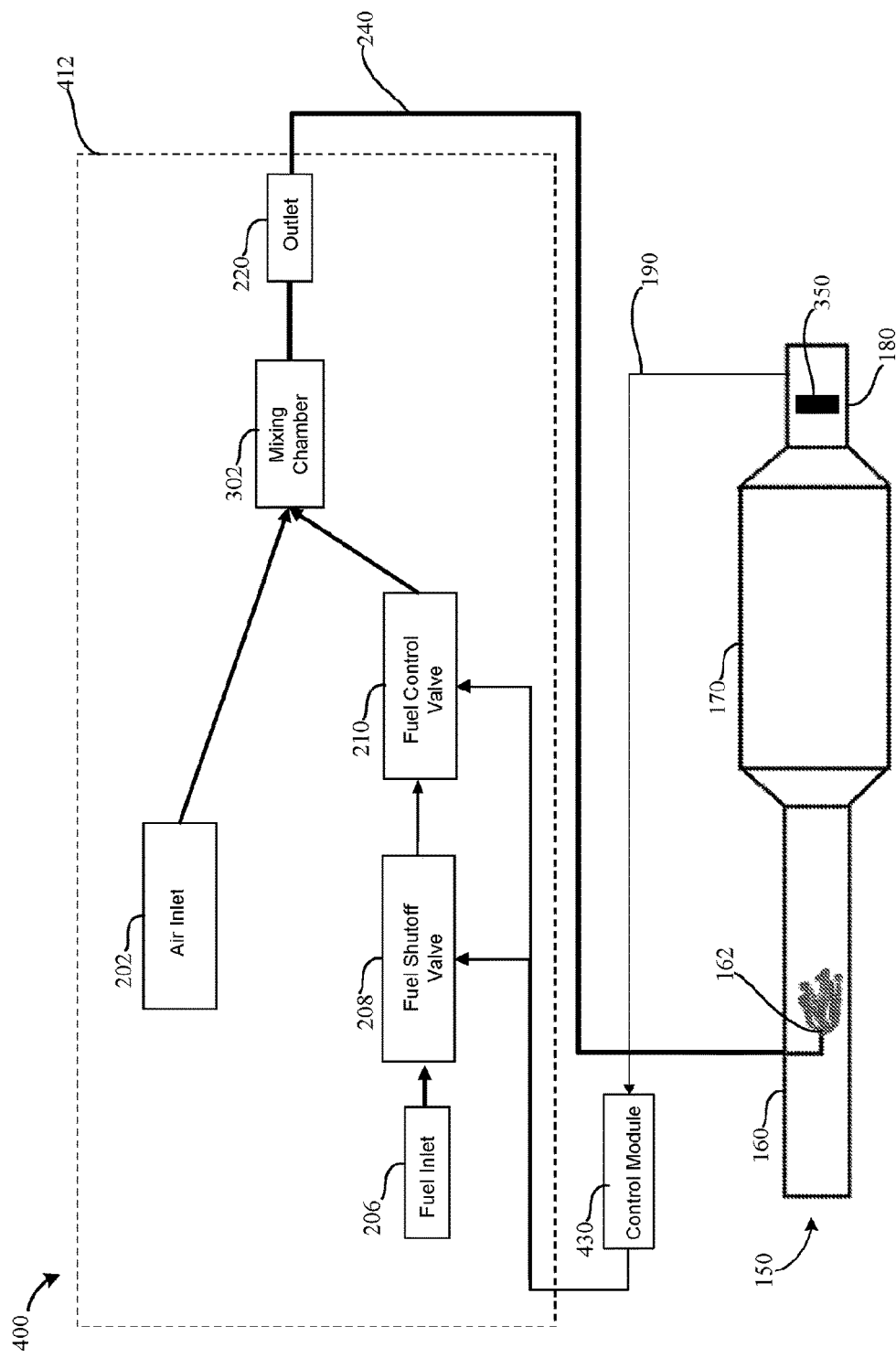
FIG. 4 is a schematic block diagram of an air-assisted FDM implemented in an exhaust system, according to another example embodiment.

FIG. 4 shows a schematic block diagram of an air-assisted FDM 400 implemented in an exhaust system, according to an example embodiment. The air-assisted FDM 400 of FIG. 4 is similar to the air-assisted FDM 300 of FIG. 3. Accordingly, like numbering is used to designate similar components between the air-assisted FDM 400 of FIG. 4 and the components of the air-assisted FDM 300 of FIG. 3. A difference between the air-assisted FDM 400 of FIG. 4 and the air-assisted FDM 300 of FIG. 3 is the air-assisted FDM 400 of FIG. 4 does not include an air shutoff valve 204 and the air is introduced downstream of the fuel control valve 210. The air-assisted FDM 400 may be included within a housing 412. The housing 412 includes an air inlet 202, a fuel inlet 206, a fuel shutoff valve 208, a fuel control valve 210, a mixing chamber 302, and an outlet 220 packaged together. The mixing chamber 302 is configured to receive air from the air inlet 202 and fuel from the fuel control valve 210 and output the mixed fluid to the outlet 220. The air and fuel may be mixed in a separate mixing chamber 302, in separate ports to a mixing chamber, by introducing the air upstream of the fuel control valve 210, or by causing the two fluids to meet in a T- or Y-connection. During normal operation of the engine, the fuel shutoff valve 208 is closed. Accordingly, the fuel control valve 210 may not completely shutoff flow of the fuel. Specifically, the air-assisted FDM 400 is configured such that air flow is removing particles from the dosing line continuously during normal operation of the engine.

When the DPF needs to be regenerated, the fuel shutoff valve 208 is opened and the fuel control valve 210 is open to the degree required for regeneration—as indicated by the control module 230. In some embodiments, the cleaning cycle occurs with a mixture containing at least 5% air (with the remainder being fuel). In other embodiments, even when fuel dosing is occurring, the dosing occurs with a mixture containing at least 5% air (with the remainder being fuel). In some embodiments, a thermocouple 350 or other temperature sensor is positioned the downstream side of the DOC chamber 170 and is configured to send a signal to the control module 230. The signal may cause the control module 230 to adjust one or more connected valves to control temperature of the exhaust gas during regeneration of the DPF. In other words, the dosing can be metered by a closed circuit loop that takes input from the thermocouple 350. The air-to-fuel ratio depends on the position of the fuel shutoff valve 208 and the fuel control valve 210. Accordingly, in the cleaning mode FDM system 400, there is no separate purging mode of operation as the FDM system 400 provides continuous or near continuous air flow to accomplish a continuous or near continuous removal of particles from the system during engine operation and dosing modes.

Figure 5:
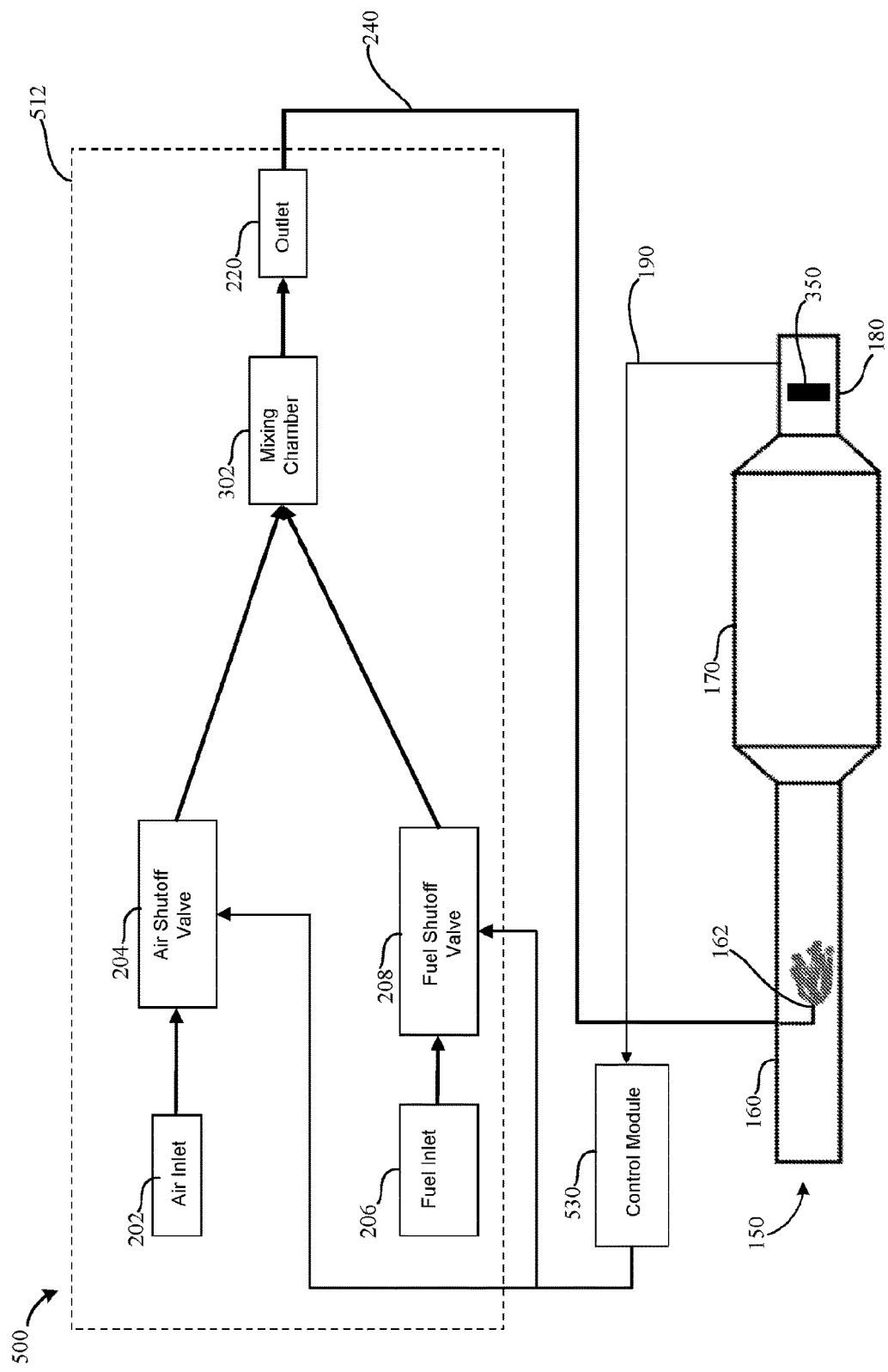
FIG. 5 is a schematic block diagram of an air-assisted FDM implemented in an exhaust system, according to yet another example embodiment.

Turning to FIG. 5, a schematic block diagram of an air-assisted FDM 500 implemented in an exhaust system 150 is shown, according to yet another example embodiment. The air-assisted FDM 500 of FIG. 5 is similar to the air-assisted FDM 300 of FIG. 3. Accordingly, like numbering is used to designate similar components between the air-assisted FDM 500 of FIG. 5 and the components of the air-assisted FDM of FIG. 3. A difference between the air-assisted FDM 500 of FIG. 5 and the air-assisted FDM of FIG. 3 is the air-assisted FDM 500 of FIG. 5 does not include a fuel control valve 210 and the air is introduced downstream of the fuel shutoff valve 208. The air-assisted FDM 500 may be included within a housing 512. The housing 512 includes an air inlet 202, an air flow valve, a fuel inlet 206, a fuel shutoff valve 208, a mixing chamber 302, and an outlet 220 packaged together. The mixing chamber 302 is configured to receive air from the air flow valve and fuel from the fuel shutoff valve 208 and output the mixed fluid to the outlet 220. The air and fuel may be mixed in a separate mixing chamber 302, in separate ports to a mixing chamber, by introducing the air upstream of the fuel control valve 210, or by causing the two fluids to meet in a T- or Y-connection. During normal operation of the engine, the fuel shutoff valve 208 is closed. Accordingly, the air flow valve and fuel shutoff valve 208 do not completely shutoff flow of their respective fluids. Specifically, the air-assisted FDM 500 is configured such that air flow is removing particles from the dosing line continuously during normal operation of the engine.

When the DPF needs to be regenerated, the fuel shutoff valve 208 is opened and the air flow valve is open to the degree required for regeneration—as indicated by the control module 230. In some embodiments, the cleaning cycle occurs with a mixture containing at least 5% air (with the remainder being fuel). In some embodiments, a thermocouple 350 or other temperature sensor is positioned the downstream side of the DOC chamber 170 and is configured to send a signal to the control module 230. The signal may cause the control module 230 to adjust one or more connected valves to control temperature of the exhaust gas during regeneration of the DPF. The air-to-fuel ratio depends on the position of the fuel shutoff valve 208 and the air shutoff valve 204. In other words, the air-to-fuel ratio is dependent upon the frequency and duration of opening and closing the fuel shutoff valve 208 (e.g., or similar fuel valve) as the air shutoff valve 204 is open during the cleaning mode. Accordingly, in the FDM system 500, there is no separate purging mode of operation as the FDM system 500 provides continuous or near continuous air flow to accomplish a continuous or near continuous removal of particles from the system during engine operation and dosing modes.

Figure 6:
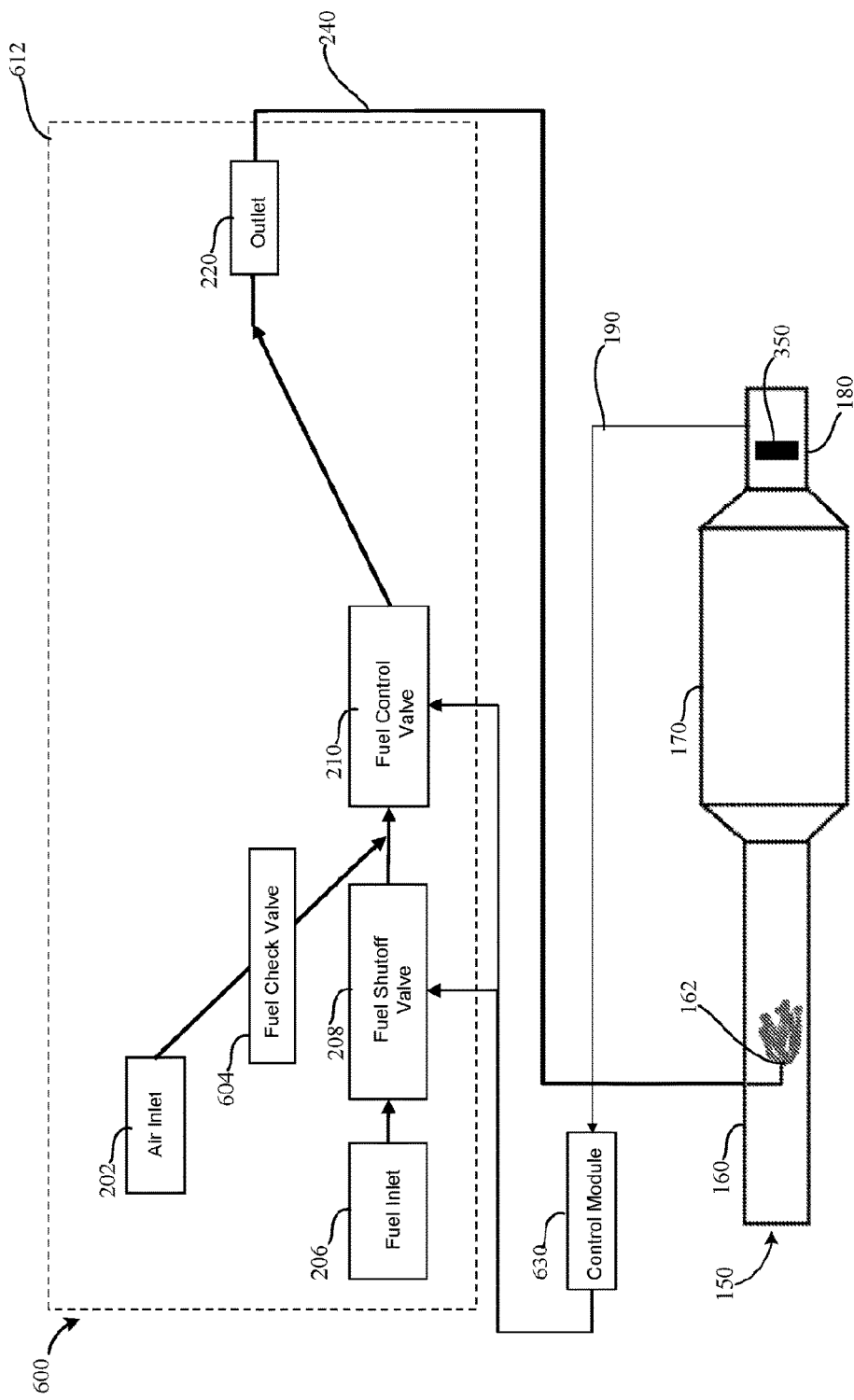
FIG. 6 is a schematic block diagram of an air-assisted FDM implemented in an exhaust system, according to an even further example embodiment.

Referring to FIG. 6, a schematic block diagram of an air-assisted FDM 600 implemented in an exhaust system 150 is shown, according to an even further example embodiment. The air-assisted FDM 600 of FIG. 6 is similar to the air-assisted FDM of FIG. 4. Accordingly, like numbering is used to designate similar components between the air-assisted FDM 600 of FIG. 6 and the components of the air-assisted FDM of FIG. 4. A difference between the air-assisted FDM 600 of FIG. 6 and the air-assisted FDM of FIG. 4 is the air-assisted FDM 600 of FIG. 6 includes a fuel check valve 604 between the air inlet 202 and the fuel control valve 210 and the air is introduced upstream of the fuel control valve 210 thereby eliminating the need for a mixing chamber 302. The air-assisted FDM 600 may be included within a housing 612. The housing 612 includes an air inlet 202, a fuel check valve 604, a fuel inlet 206, a fuel shutoff valve 208, a fuel control valve 210, and an outlet 220 packaged together. The fuel control valve 210 is configured to receive air from air inlet 202 and fuel from the fuel shutoff valve 208 and output the mixed fluid to the outlet 220. During normal operation of the engine, the fuel shutoff valve 208 is closed. Accordingly, the fuel control valve 210 does not completely shutoff flow of their respective fluids. Specifically, the air-assisted FDM 600 is configured such that air flow is removing particles from the dosing line continuously during normal operation of the engine.

When the DPF needs to be regenerated, the fuel shutoff valve 208 is opened and the fuel control valve 210 is open to the degree required for regeneration—as indicated by the control module 230. In some embodiments, the fuel check valve 604, fuel control valve 210, and/or the fuel shutoff valve 208 is adjusted by the control module 230 or similar controller to yield a 5% air-to-fuel ratio for regeneration. In some embodiments, the cleaning cycle occurs with a mixture containing at least 5% air (with the remainder being fuel). In some embodiments, the restriction downstream of the combination of the fuel and air is less than the restriction in the air inlet 202 upstream of the combination point. In other embodiments, the air flow may be stopped by the fuel check valve 604 while dosing fuel such that continuous air that removes particles in the dosing line is not provided, however there is no need for a separate air flow control or air flow shutoff valve. Accordingly, in these embodiments, there is no air flow when the air flow is stopped by the fuel pressure (e.g., the fuel flow back up is stopped by the fuel check valve 604). In some embodiments, a thermocouple 350 or other temperature sensor is positioned the downstream side of the DOC chamber 170 and is configured to send a signal to the control module 230. The signal may cause the control module 230 to adjust one or more connected valves to control temperature of the exhaust gas during regeneration of the DPF. In some embodiments, the air-to-fuel ratio depends on the position of the fuel shutoff valve 208, fuel control valve 210, and the fuel check valve 604. In other words, the air-to-fuel ratio is dependent upon the frequency and duration of opening and closing the of the fuel valves. Accordingly, in the cleaning mode FDM system 600, there is no separate purging mode of operation as the FDM system 600 provides continuous or near continuous air flow to accomplish a continuous or near continuous removal of particles from the system during engine operation and dosing modes.

Figure 7A:
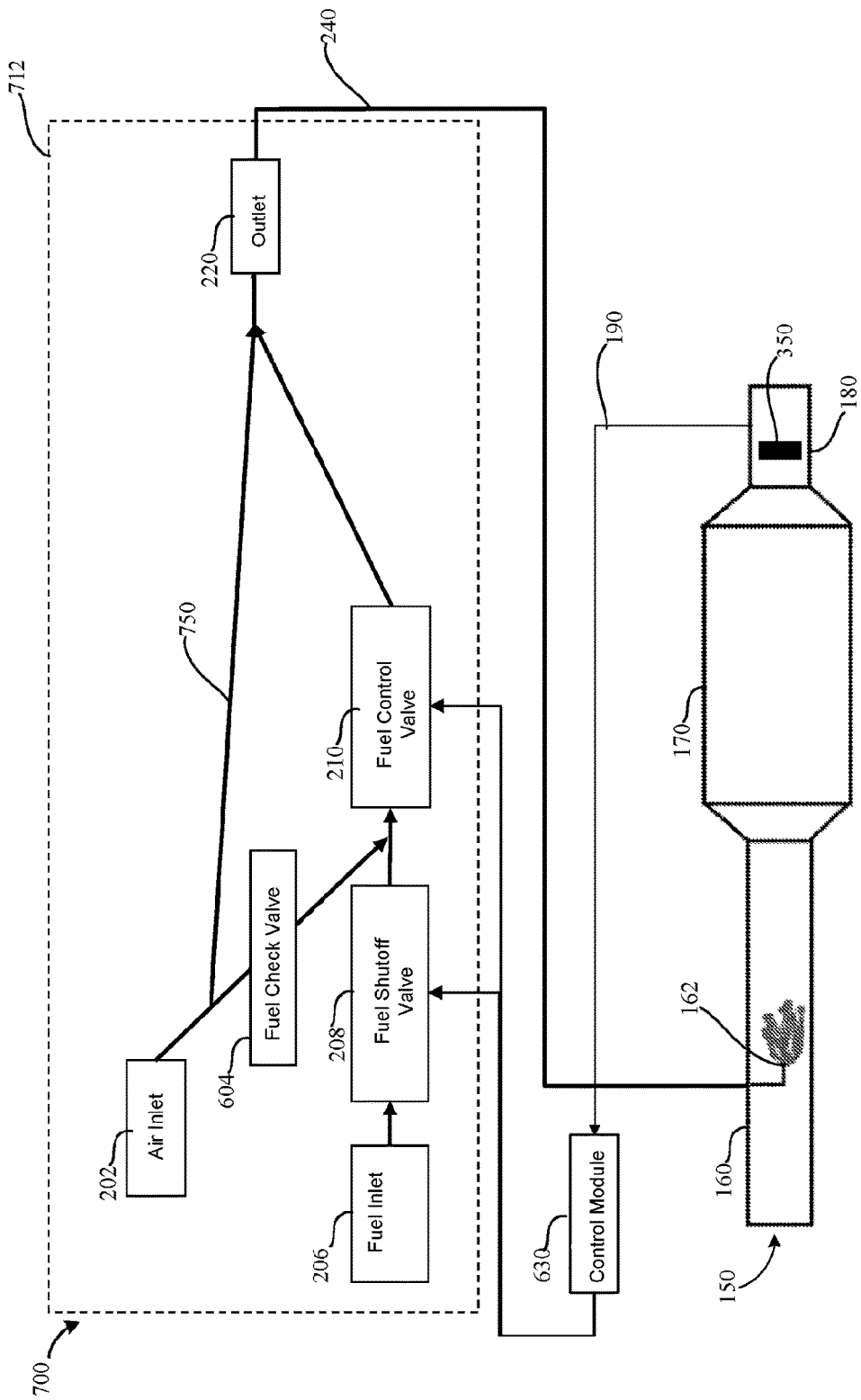
FIG. 7A is a schematic block diagram of an air-assisted FDM implemented in an exhaust system, according to an even further example embodiment.

Referring to FIG. 7A, a schematic block diagram of an air-assisted FDM 700 implemented in an exhaust system 150 is shown, according to an even further example embodiment. The air-assisted FDM 700 of FIG. 7A is similar to the air-assisted FDM 600 of FIG. 6. Accordingly, like numbering is used to designate similar components between the air-assisted FDM 700 of FIG. 7A and the components of the air-assisted FDM 600 of FIG. 6. A difference between the air-assisted FDM 700 of FIG. 7A and the air-assisted FDM 600 of FIG. 6 is the air-assisted FDM 700 of FIG. 7A includes an air bypass line 750 that is configured to direct air around the fuel check valve 604 and the fuel control valve 210. The air-assisted FDM 700 may be included within a housing 712. The housing 712 includes an air inlet 202, a fuel check valve 604, a fuel inlet 206, a fuel shutoff valve 208, a fuel control valve 210, and an outlet 220 packaged together. The fuel control valve 210 is configured to receive air from air inlet 202 and fuel from the fuel shutoff valve 208 and output the mixed fluid to the outlet 220. During normal operation of the engine, the fuel shutoff valve 208 is closed. Accordingly, the air flow valve and fuel control valve 210 do not completely shutoff flow of their respective fluids. Specifically, the air-assisted FDM 700 is configured such that air flow is removing particles from the dosing line continuously during normal operation of the engine.

When the DPF needs to be regenerated, the fuel shutoff valve 208 is opened and the fuel control valve 210 is open to the degree required for regeneration—as indicated by the control module 230. In some embodiments, the fuel check valve 604 is set and/or the fuel shutoff valve 208 is adjusted by the control module 230 or similar controller to yield a 5% air-to-fuel ratio for regeneration. When the fuel pressure exceeds the air pressure during dosing fuel may flow upstream in the air line until stopped by the fuel check valve 604. Beneficially, the air bypass line 750 enables air to continue to flow into the dosing line when fuel flows upstream in the air line to the fuel check valve 604, thereby enabling continuous removal of particles and air to flow to the fuel dosing line. In some embodiments, the restriction downstream of the combination of the fuel and air is less than the restriction in the air inlet 202 upstream of the combination point. In other embodiments, the air flow may be stopped by the fuel check valve 604 while dosing fuel such that continuous air purging is not provided, however there is no need for a separate air flow control or air flow shutoff valve. Accordingly, in these embodiments, there is no air flow when the air flow is stopped by the fuel check valve 604. In some embodiments, an air flow valve is positioned downstream of the air inlet and upstream of the fuel valve and the air bypass line 750 is downstream of the air inlet 202 and upstream of the outlet 220. In those embodiments, the air flow valve is configured to control air flow from the air inlet 202 into the fuel valve and the air bypass line 750 is configured to direct air to the outlet 220 and bypass the fuel valve.

In some embodiments, a thermocouple 350 or other temperature sensor is positioned the downstream side of the DOC chamber 170 and is configured to send a signal to the control module 230. The signal may cause the control module 230 to adjust one or more connected valves to control temperature of the exhaust gas during regeneration of the DPF. In some embodiments, the air-to-fuel ratio depends on the position of the fuel shutoff valve 208 and the fuel check valve 604. In other words, the air-to-fuel ratio is dependent upon the frequency and duration of opening and closing the fuel valve(s). Accordingly, in the cleaning mode FDM system 700, there is no separate purging mode of operation as the FDM system 700 provides continuous or near continuous air flow to accomplish a continuous or near continuous removal of particles from the system during engine operation and dosing modes.

Figure 7B:
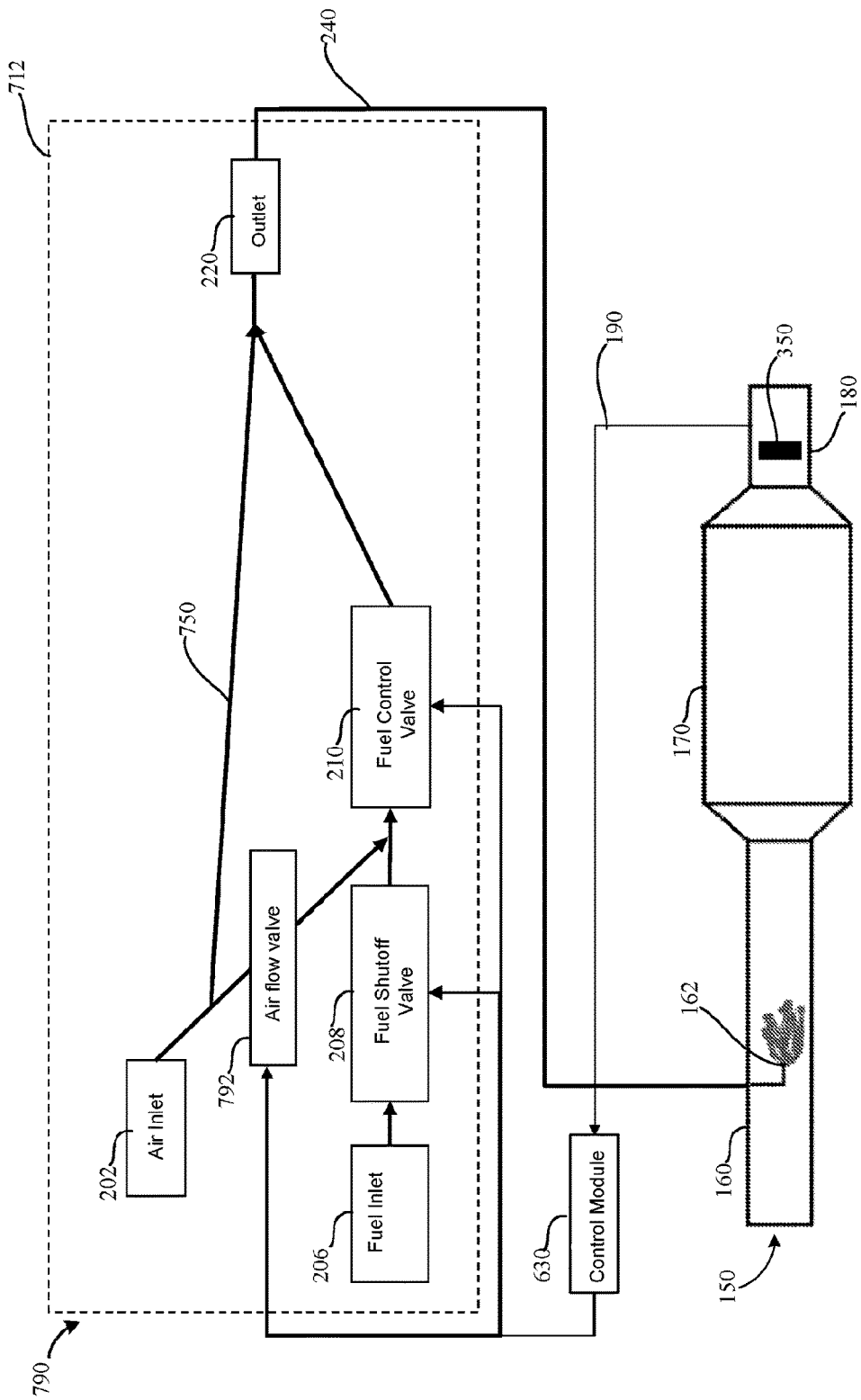
FIG. 7B is a schematic block diagram of an air-assisted FDM implemented in an exhaust system, according to an even further example embodiment.

FIG. 7B is a schematic block diagram of an air-assisted FDM 790 implemented in an exhaust system 150 is shown, according to an even further example embodiment. The air-assisted FDM 790 of FIG. 7B is similar to the air-assisted FDM 700 of FIG. 7A. Accordingly, like numbering is used to designate similar components between the air-assisted FDM 790 of FIG. 7B and the components of the air-assisted FDM 700 of FIG. 7A. A difference between the air-assisted FDM 790 of FIG. 7B and the air-assisted FDM 700 of FIG. 7A is the air-assisted FDM 790 of FIG. 7B includes an air flow valve 792 operably connected to the control module 630 instead of a fuel check valve 604.

Figure 8:
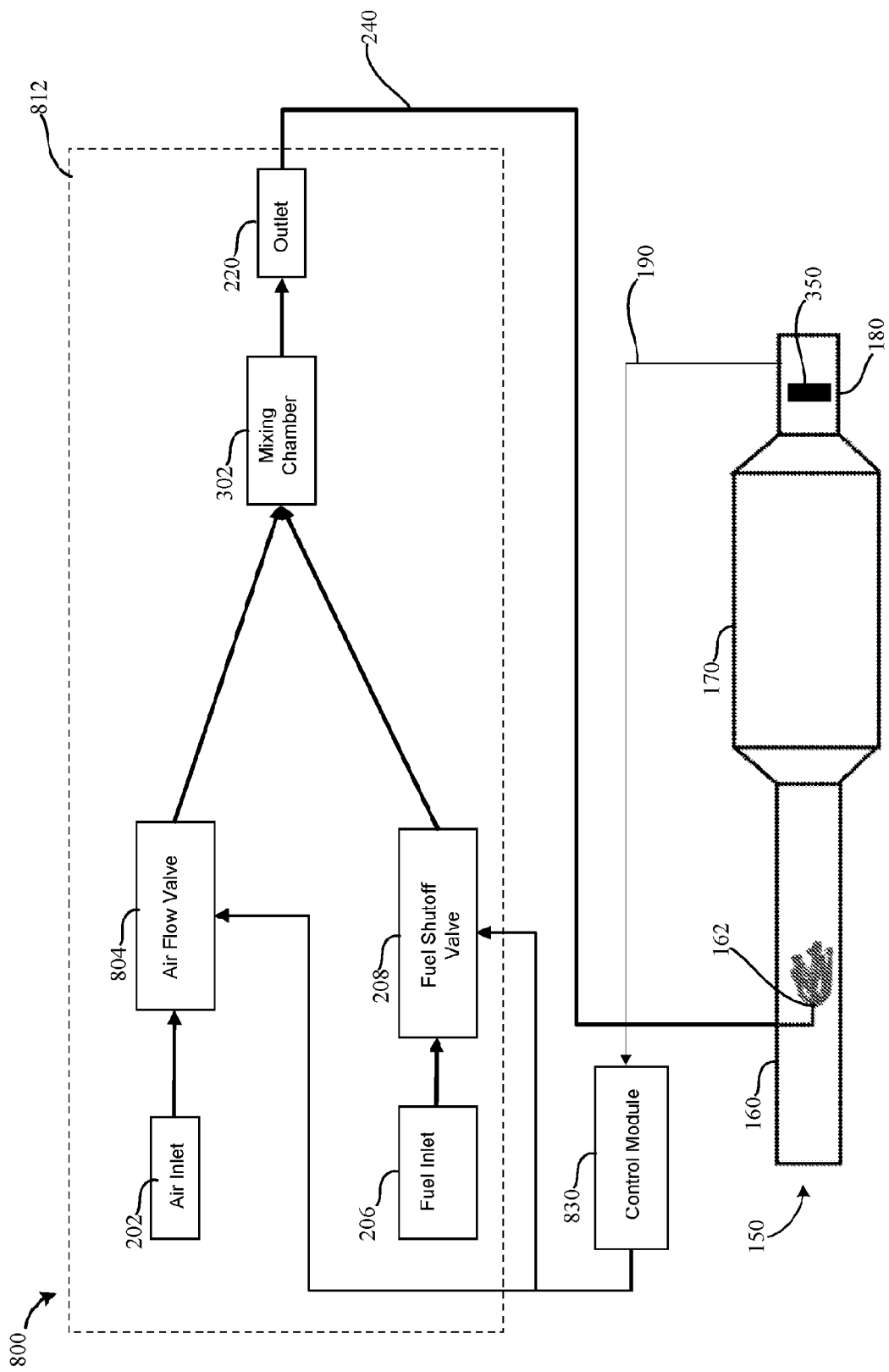
FIG. 8 is a schematic block diagram of an air-assisted FDM implemented in an exhaust system, according to an even further example embodiment.

Referring to FIG. 8, a schematic block diagram of an air-assisted FDM 800 implemented in an exhaust system 150 is shown, according to an even further example embodiment. The air-assisted FDM 800 of FIG. 8 is similar to the air-assisted FDM 300 of FIG. 3. Accordingly, like numbering is used to designate similar components between the air-assisted FDM 800 of FIG. 8 and the components of the air-assisted FDM 300 of FIG. 3. A difference between the air-assisted FDM 800 of FIG. 8 and the air-assisted FDM 300 of FIG. 3 is the air-assisted FDM 800 of FIG. 8 includes a two position air flow valve 804 instead of an adjustable air shutoff valve 204. The two position air flow valve 804 is configured to provide 100% air flow in wide open position or reduced flow, for example, between 5 and 20% flow, depending of the mode of operation. The housing 812 includes an air inlet 202, an air flow valve 804, a fuel inlet 206, a fuel shutoff valve 208, a fuel control valve 210, a mixing chamber 302, and an outlet 220 packaged together. The mixing chamber 302 is configured to receive air from the air flow valve 804 and fuel from the fuel control valve 210 and output the mixed fluid to the outlet 220. The air and fuel may be mixed in a separate mixing chamber 302, in separate ports to a mixing chamber, by introducing the air upstream of the fuel control valve 210, or by causing the two fluids to meet in a T- or Y-connection. During normal operation of the engine, the fuel shutoff valve 208 is closed and the air flow valve 804 is set at its minimum maintenance flow position. Accordingly, the air flow valve 804 and fuel control valve 210 do not completely shutoff flow of their respective fluids. Specifically, the air-assisted FDM 800 is configured such that air flow is removing particles from the dosing line continuously during normal operation of the engine.

When the DPF needs to be regenerated, the air flow valve 804 is opened completely (100% open position), the fuel shutoff valve 208 is opened. During this time, fuel with entrained air bubbles flows through the dosing line(s) 240 to the nozzles. The air-fuel mixture dislodges contaminants adhering to the walls of the dosing lines and nozzles, thereby enhancing cleaning. The fuel shutoff valve 208 continues to open further to the position providing required for optimal regeneration—as indicated by the control module 230. At this point, the air valve is returned to it minimal air flow position. When regeneration is complete, the air flow valve 804 is returned to its completely open position and the fuel shutoff valve 208 closes. During this process until the fuel shutoff valve 208 is completed closed, fuel with entrained air bubbles flows through the dosing lines 240 to the nozzles (it should be noted that, in certain implementations, fuel with entrained air bubbles may flow through the dozing lines only at the beginning or the end of the regeneration process, as opposed to both at the beginning and at the end). Once the fuel shutoff valve 208 is closed, the air valve is returned to its minimum position. In some embodiments, the FDM 800 is configured such that the cleaning cycle occurs with a mixture containing at least 5% air (with the remainder being fuel).

In some embodiments, a thermocouple 350 or other temperature sensor is positioned on the downstream side of the DOC chamber 170 and is configured to send a signal to the control module 230. The signal may cause the control module 230 to adjust one or more connected valves to control temperature of the exhaust gas during regeneration of the DPF. Accordingly, in the cleaning mode FDM system 800, the FDM system 800 provides continuous or near continuous air flow to accomplish a continuous or near continuous removal of particles from the system, as well as at least one period of air-fuel mixture removal of particles from the dosing line. Further, during dosing the flow is air-assisted to increase dosing line pressure and reduce the size of droplets generated by the nozzle 162.

Figure 9:
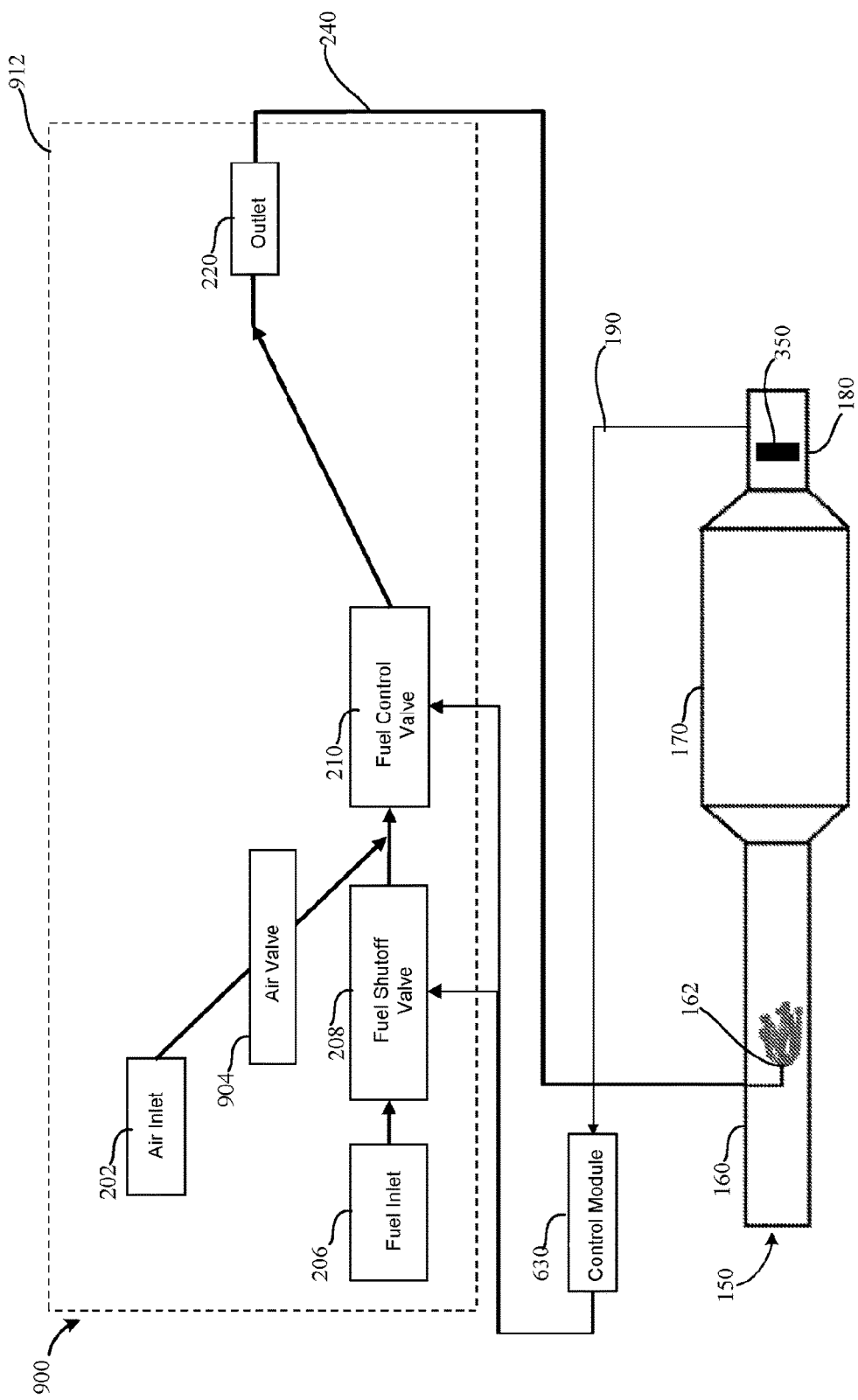
FIG. 9 is a schematic block diagram of an air-assisted FDM implemented in an exhaust system, according to a still further example embodiment.

Referring to FIG. 9, a schematic block diagram of an air-assisted FDM 900 implemented in an exhaust system 150 is shown, according to an even further example embodiment. The air-assisted FDM 900 of FIG. 9 is similar to the air-assisted FDM 600 of FIG. 6. Accordingly, like numbering is used to designate similar components between the air-assisted FDM 900 of FIG. 9 and the components of the air-assisted FDM 600 of FIG. 6. A difference between the air-assisted FDM 900 of FIG. 9 and the air-assisted FDM 600 of FIG. 6 is the air-assisted FDM 900 of FIG. 9 does not include a fuel check valve 604 but includes an air valve 904 between the air inlet 202 and the fuel control valve 210. The air in the FDM 900 is introduced upstream of the fuel control valve 210 and thereby eliminates the need for a mixing chamber 302. The air valve 904 is a two position air valve that is configured to provide 100% air flow in wide open position or reduced flow, for example between 5 and 20% flow, depending of the mode of operation. The air-assisted FDM 900 may be included within a housing 912. The housing 912 includes an air inlet 202, the air valve 904, a fuel inlet 206, a fuel shutoff valve 208, a fuel control valve 210, and an outlet 220 packaged together. The fuel control valve 210 is configured to receive air from air inlet 202 and fuel from the fuel shutoff valve 208 and output the mixed fluid to the outlet 220. During normal operation of the engine, the fuel shutoff valve 208 is closed. Accordingly, the air valve 904 and fuel control valve 210 do not completely shutoff flow of their respective fluids. Specifically, the air-assisted FDM 900 is configured such that air flow is removing particles from the dosing line continuously during normal operation of the engine.

When the DPF needs to be regenerated, the air valve 904 is opened completely (100% open position), the fuel shutoff valve 208 is opened, and the fuel control valve 210 begins to open. During this time, air bubbles are created in the fuel control valve 210 by the mixing of fuel and air, and fuel with entrained air bubbles flows through the dosing line(s) 240 to the nozzles. The air-fuel mixture dislodges contaminants adhering to the walls and sides of the fuel control valve 210, dosing lines and nozzles, enhancing cleaning. The fuel control valve 210 continues to open further to the position providing required for optimal regeneration—as indicated by the control module 230. At this point, the air valve is returned to it minimal air flow position. When regeneration is complete, the air valve 904 is returned to its completely open position, the fuel control valve 210 reduces the fuel flow rate, and the fuel shutoff valve 208 closes. During this process until the fuel shutoff valve 208 is completed closed, fuel with entrained air bubbles flows through the dosing line(s) 240 to the nozzles (it should be noted that, in certain implementations, fuel with entrained air bubbles may flow through the dozing lines only at the beginning or the end of the regeneration process, as opposed to both at the beginning and at the end). Once the fuel shutoff valve 208 is closed, the air valve 904 is returned to its minimum position. In some embodiments, the cleaning cycle occurs with a mixture containing at least 5% air (with the remainder being fuel).

In some embodiments, a thermocouple 350 or other temperature sensor is positioned on the downstream side of the DOC chamber 170 and is configured to send a signal to the control module 230. The signal may cause the control module 230 to adjust one or more connected valves to control temperature of the exhaust gas during regeneration of the DPF. Accordingly, in the cleaning mode FDM system 900, the FDM system 900 provides continuous or near continuous air flow to accomplish a continuous or near continuous removal of particles from the system, as well as at least one period of air-fuel mixture removal of particles from the dosing line. Further, during dosing the flow is air-assisted to increase dosing line pressure and reduce the size of droplets generated by the nozzle 162.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A system comprising:
    a nozzle;
    a dosing line connected to the nozzle and a fuel dosing module;
    the fuel dosing module in fluid communication with the dosing line, the fuel dosing module comprising:
        an outlet in fluid communication with the dosing line;
        an air inlet positioned upstream of the outlet, the air inlet configured to receive air;
        a fuel inlet positioned upstream of the outlet, the fuel inlet configured to receive fuel; and
        a fuel valve positioned upstream of the outlet and downstream of the fuel inlet, the fuel valve configured to control a flow of fuel, wherein the fuel dosing module is configured to combine the fuel and the air upstream of the outlet and downstream of the fuel inlet to generate an air-fuel fluid, wherein the air-fuel fluid removes particles from the nozzle; and
    a control module operably connected the fuel valve, the control module controlling the fuel dosing module between a dosing state, a purge state, and a cleaning state, the control module causing fuel flow through the dosing line and the nozzle in the dosing state, the control module causing air flow through the dosing line to purge the fuel from the dosing line and the nozzle in the purge state, and the control module causing air-fuel fluid flow through the dosing line to remove particles from the nozzle in the cleaning state, the control module maintaining an air valve open during transitions between the cleaning state and the purge state.

2. The system of claim 1, wherein the control module is configured to cause the fuel valve to open and close in the cleaning state to produce a first flow surge upstream of the fuel valve and a second flow surge downstream of the fuel valve during a cleaning operation, the second flow surge removing particles from the dosing line and the nozzle and the first flow surge removing particles from lines between the fuel inlet and the fuel valve.

3. The system of claim 2, wherein the control module is configured to enter the dosing state before entering the cleaning state, and wherein the control module is configured to enter the purge state after the cleaning state.

4. The system of claim 1, wherein the fuel dosing module is configured to pass the air-fuel fluid through the outlet into the dosing line, the air-fuel fluid forming bubbles that cause turbulence along a surface of the dosing line and remove particles from the surface of the dosing line.

5. The system of claim 4, wherein the fuel valve is configured to open and close to produce a first flow surge upstream of the fuel valve and a second flow surge downstream of the fuel valve during a cleaning operation, the second flow surge facilitating re-entrainment of contamination deposited along the dosing line and the nozzle and the first flow surge facilitating re-entrainment of contamination deposited along the fuel inlet.

6. The system of claim 1, further comprising the air valve downstream of the air inlet and upstream of the fuel valve, the air valve operably connected to the control module and configured to facilitate air flow from the air inlet into the fuel valve, the control module maintaining the air valve open throughout the purge state.

7. The system of claim 1, further comprising the air valve downstream of the air inlet and upstream of the outlet, wherein the air to fuel ratio in the air-fuel fluid is dependent upon the air valve opening and dependent upon the fuel valve opening.

8. The system of claim 7, wherein the air-fuel fluid is at least 5-percent air.

9. The system of claim 1, further comprising a mixing chamber downstream of the fuel valve and the air inlet, and upstream of the outlet, the mixing chamber configured to receive the air from the air inlet and the fuel from the fuel valve to combine the fuel and the air upstream of the outlet to generate the air-fuel fluid, the mixing chamber passing the air-fuel fluid to the outlet.

10. The system of claim 1, wherein the fuel dosing module is configured to combine the fuel and the air upstream of the outlet and downstream of the fuel valve to generate the air-fuel fluid.

11. A system comprising,
a nozzle;
a dosing line connected to the nozzle and a fuel dosing module;
the fuel dosing module in fluid communication with the dosing line, the fuel dosing module comprising:
an outlet in fluid communication with the dosing line;
an air inlet positioned upstream of the outlet, the air inlet configured to receive air;
a fuel inlet positioned upstream of the outlet, the fuel inlet configured to receive fuel; and
a fuel valve positioned upstream of the outlet and downstream of the fuel inlet, the fuel valve configured to control a flow of fuel, wherein the fuel dosing module is configured to combine the fuel and the air upstream of the outlet and downstream of the fuel inlet to generate an air-fuel fluid, wherein the air-fuel fluid removes particles from the nozzle; and
a control module operably connected the fuel valve, the control module controlling the fuel dosing module between a dosing state, a purge state, and a cleaning state, the control module causing fuel flow through the dosing line and the nozzle in the dosing state, the control module causing air flow through the dosing line to purge the fuel from the dosing line and the nozzle in the purge state, and the control module causing the air-fuel fluid to remove particles from the nozzle in the cleaning state, wherein the control module is configured to control air flow through the air inlet to provide near continuous air flow to accomplish a near continuous removal of particles in the dosing state, the control module maintaining an air flow valve open during transitions between the cleaning state and the purge state.

12. The system of claim 11, further comprising the air flow valve downstream of the air inlet and upstream of the outlet, the air flow valve operably connected to the control module and configured to provide near continuous air flow to accomplish a near continuous removal of particles in the dosing state.

13. A system comprising,
a nozzle;
a dosing line connected to the nozzle and a fuel dosing module;
the fuel dosing module in fluid communication with the dosing line, the fuel dosing module comprising:
an outlet in fluid communication with the dosing line;
an air inlet positioned upstream of the outlet, the air inlet configured to receive air;
a fuel inlet positioned upstream of the outlet, the fuel inlet configured to receive fuel; and
a fuel valve positioned upstream of the outlet and downstream of the fuel inlet, the fuel valve configured to control a flow of fuel, wherein the fuel dosing module is configured to combine the fuel and the air upstream of the outlet and downstream of the fuel inlet to generate an air-fuel fluid, wherein the air-fuel fluid removes particles from the nozzle;
a fuel shutoff valve positioned upstream of the fuel valve;
an air flow valve downstream of the air inlet and upstream of the fuel valve, the air flow valve configured to control air flow from the air inlet into the fuel valve; and
an air bypass line downstream of the air inlet and upstream of the outlet, the air bypass line configured to direct the air to the outlet and bypass the fuel valve.

14. A system comprising,
a nozzle;
a dosing line connected to the nozzle and a fuel dosing module;
the fuel dosing module in fluid communication with the dosing line, the fuel dosing module comprising:
an outlet in fluid communication with the dosing line;
an air inlet positioned upstream of the outlet, the air inlet configured to receive air;
a fuel inlet positioned upstream of the outlet, the fuel inlet configured to receive fuel; and
a fuel valve positioned upstream of the outlet and downstream of the fuel inlet, the fuel valve configured to control a flow of fuel, wherein the fuel dosing module is configured to combine the fuel and the air upstream of the outlet and downstream of the fuel inlet to generate an air-fuel fluid, wherein the air-fuel fluid removes particles from the nozzle;
a control module operably connected the fuel valve, the control module controlling the fuel dosing module between a dosing state, a purge state, and a cleaning state, the control module causing fuel flow through the dosing line and the nozzle in the dosing state, the control module causing air flow through the dosing line to purge the fuel from the dosing line and the nozzle in the purge state, and the control module causing air-fuel fluid flow through the dosing line to remove particles from the nozzle in the cleaning state, the control module maintaining an air valve open during transitions between the cleaning state and the purge state; and
a pressure sensor upstream of the fuel valve and downstream of the fuel inlet, the pressure sensor configured to measure a pressure through the fuel inlet and the fuel valve.

15. A method of purging particles from a dosing line connected to a nozzle, comprising:
opening an air valve of a fuel dosing module, the air valve positioned upstream of an outlet of the fuel dosing module and downstream of an air inlet configured to receive air;
opening a fuel valve of the fuel dosing module from a closed position subsequent to opening the air valve, the fuel dosing module in fluid communication with the dosing line, the fuel valve positioned upstream of the outlet and downstream of a fuel inlet, the fuel inlet configured to receive fuel and the outlet in fluid communication with the dosing line;
initiating a cleaning cycle by oscillating the fuel valve by opening and closing at a frequency, thereby generating an air-fuel fluid, wherein the air-fuel fluid removes particles from along the dosing line and the nozzle, the air-fuel fluid generated as a result of the oscillation of the fuel valve, allowing a flow of air-fuel fluid to the outlet;

initiating a dosing operation by opening the fuel valve, the dosing operation comprising injecting fuel from the fuel inlet to the nozzle, via the dosing line;

initiating an air purge operation after oscillating the fuel valve to generate the air-fuel fluid, the air purge operation comprising injecting air from the air inlet to the nozzle to purge the fuel from the dosing line and the nozzle; and maintaining the air valve open during transitions between the cleaning cycle and the air purge operation.

16. The method of claim 15, wherein oscillating the fuel valve produces a first flow surge upstream of the fuel valve and a second flow surge downstream of the fuel valve, the second flow surge removing particles from the dosing line and the nozzle and the first flow surge removing particles from between the fuel inlet and the fuel valve.

17. A fuel dosing module in fluid communication with a dosing line, the fuel dosing module comprising:

an outlet in fluid communication with the dosing line;

an air inlet positioned upstream of the outlet, the air inlet configured to receive air;

a fuel inlet positioned upstream of the outlet, the fuel inlet configured to receive fuel;

a fuel valve positioned upstream of the outlet and downstream of the fuel inlet, the fuel valve configured to control a flow of fuel; and a control module operably connected to the fuel valve, wherein the control module is configured to control the fuel valve between a dosing state, a purge state, and a cleaning state, the control module configured to open the fuel valve to cause fuel flow through the dosing line in the dosing state, the control module configured to close the fuel valve during the purge state to purge the fuel from the dosing line during the purge state, and the control module configured to oscillate the fuel valve to combine the fuel and the air upstream of the outlet and downstream of the fuel inlet to generate an air-fuel fluid during the cleaning state, wherein the air-fuel fluid removes particles along the dosing line, the control module maintaining an air valve open during transitions between the cleaning state and the purge state.

18. The fuel dosing module of claim 17, further comprising the air valve positioned upstream of the outlet and downstream of the air inlet, the air valve separate from the fuel valve, the control module maintaining the air valve open throughout the purge state.

* * * * *